United States Patent
Jang et al.

(10) Patent No.: US 6,832,073 B2
(45) Date of Patent: Dec. 14, 2004

(54) APPARATUS AND METHOD FOR CANCELLING INTERFERENCE SIGNALS TRANSMITTED FROM NEIGHBOR BASE STATIONS

(75) Inventors: Il-Soon Jang, Taejon (KR); Deuk Su Lyu, Taejon (KR); Hyun Seo Oh, Taejon (KR); Hyoung-Goo Jeon, Busan (KR)

(73) Assignee: Electronics and Telecommunications Research Institute, Taejon (KR)

( * ) Notice: Subject to any disclaimer, the term of this patent is extended or adjusted under 35 U.S.C. 154(b) by 432 days.

(21) Appl. No.: 10/125,555

(22) Filed: Apr. 19, 2002

(65) Prior Publication Data

US 2003/0119451 A1 Jun. 26, 2003

(30) Foreign Application Priority Data

Dec. 22, 2001 (KR) ........................................ 2001-83171

(51) Int. Cl.[7] ............................................. H04B 17/00
(52) U.S. Cl. ................. 455/67.13; 455/67.11; 455/115.1; 455/114.1; 455/63.1; 455/442; 455/437; 455/278.1; 370/331; 370/332; 370/335; 375/144; 375/148; 375/149; 375/324; 375/346; 375/348
(58) Field of Search .......................... 455/67 B, 67.11, 455/115.1, 114.1, 570, 63.1, 442, 437, 446, 450, 278.1; 370/252, 331, 332, 335; 375/148, 145, 149, 324, 144, 346, 348

(56) References Cited

U.S. PATENT DOCUMENTS

| | | | |
|---|---|---|---|
| 5,309,503 A | * | 5/1994 | Bruckert et al. .......... 455/452.2 |
| 6,058,136 A | * | 5/2000 | Ganesh et al. ............... 375/130 |
| 6,073,021 A | * | 6/2000 | Kumar et al. ................ 455/442 |
| 6,128,473 A | * | 10/2000 | Ritzen et al. .............. 455/63.3 |
| 6,157,668 A | * | 12/2000 | Gilhousen et al. .......... 375/130 |
| 6,252,861 B1 | * | 6/2001 | Bernstein et al. ............ 370/331 |
| 6,337,984 B1 | * | 1/2002 | Hong et al. .................. 455/439 |
| 6,546,058 B1 | * | 4/2003 | Gilhousen et al. .......... 375/285 |
| 6,609,008 B1 | * | 8/2003 | Whang et al. ............... 455/522 |
| 6,615,024 B1 | * | 9/2003 | Boros et al. .............. 455/67.14 |
| 6,639,551 B2 | * | 10/2003 | Li et al. ...................... 342/381 |

FOREIGN PATENT DOCUMENTS

| | | | | |
|---|---|---|---|---|
| KR | 2000-59672 | 7/2001 | ............ | H04B/1/69 |
| KR | 2000-86533 | 9/2001 | ........... | H04B/15/00 |
| WO | WO 00/25439 | 5/2001 | ........... | H04B/1/707 |

* cited by examiner

Primary Examiner—Marceau Milord
(74) Attorney, Agent, or Firm—Piper Rudnick LLP

(57) ABSTRACT

An apparatus and method for canceling pilot signals from neighbor base stations is disclosed. The present invention cancels unnecessary pilot signals transmitted from the neighbor base stations by detecting, analyzing a PN signal in a pilot signal of each base station, generating estimated interference signal according to analyzed information from the detected PN signal and subtracting estimated interference signal from the received signal. Therefore, the present invention increases a bandwidth of downlink transmission channel and improves the demodulator to be operatable in low signal-to-noise ratio ($E_b/N_o$).

8 Claims, 4 Drawing Sheets

APPARATUS AND METHOD FOR CANCELLING INTERFERENCE SIGNALS TRANSMITTED FROM NEIGHBOR BASE STATIONS

FIELD OF THE INVENTION

The present invention relates to a mobile communication system; and, more particularly, to an apparatus and method for canceling pilot signal transmitted from neighbor base stations and a computer readable record medium for executing the same method.

DESCRIPTION OF RELATED ARTS

International Mobile Telecommunication-2000 (IMT-2000) supporting a mobile multimedia terminal requires that a bandwidth of a downlink transmission channel is broader than an uplink transmission channel in order to provide various Internet services containing multimedia contents.

For increasing a bandwidth of a downlink transmission channel, a demodulator of the mobile station needs to be well operatable in a low signal-to-noise ratio ($E_b/N_o$) and the demodulator should be tolerable of interference signals.

A pilot signal is transmitted for synchronization of timing between the mobile station and the base station to which the mobile station belongs. The pilot signals from neighbor base stations act as interference signals to the mobile station. The pilot signal of the base station is removed by demodulation due to orthogonal characteristic in the mobile station. However, the pilot signal from the neighbor base station is not perfectly removed and remained as a strong interference signal.

SUMMARY OF THE INVENTION

It is, therefore, an object of the present invention to provide an apparatus and method of a demodulator in a mobile station canceling a pilot signal transmitted from neighbor base stations for increasing a bandwidth of downlink transmission channel and improving the demodulator operatable in low signal-to-noise ratio ($E_b/N_o$).

In accordance with an aspect of the present invention, there is provided An apparatus for canceling pilot signals from neighbor base stations to a mobile station, the apparatus including: search unit for finding signals transmitted from neighbor base stations; estimation unit for generating an estimated interference signal by estimating channels to detect characteristics of wireless channels of the neighbor base stations; cancellation unit for canceling an interference signal in the received signal based on the estimated interference signal outputted from the estimation unit and signals received from the neighbor base stations; and delay unit for delaying input of the received signal to the cancellation unit as much as time necessary for generating the estimated interference signal in the estimation unit.

In accordance with another aspect of the present invention, there is also provided a method for canceling pilot signals of neighbor base stations, including the steps of: a) searching signals transmitted from the neighbor base stations to a mobile station by analyzing a received signals; b) generating an estimated interference signal by estimating channels of the base stations to detect characteristics of wireless channels of the neighbor base stations and generating the estimated interference signal; and c) canceling an interference signal calculated by using the estimated interference signal and the signals received from the neighbor base stations.

In accordance with another aspect of the present invention, there is also provided a computer readable record medium storing instructions for implementing method for canceling pilot signals transmitted from neighbor base stations, the method including steps of: a) searching signals transmitted from the neighbor base stations to a mobile station by analyzing a received signals; b) generating an estimated interference signal by estimating channels of the base stations to detect characteristics of wireless channels of the neighbor base stations and generating the estimated interference signal; and c) canceling an interference signal calculated by using the estimated interference signal and the signals received from the neighbor base stations.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
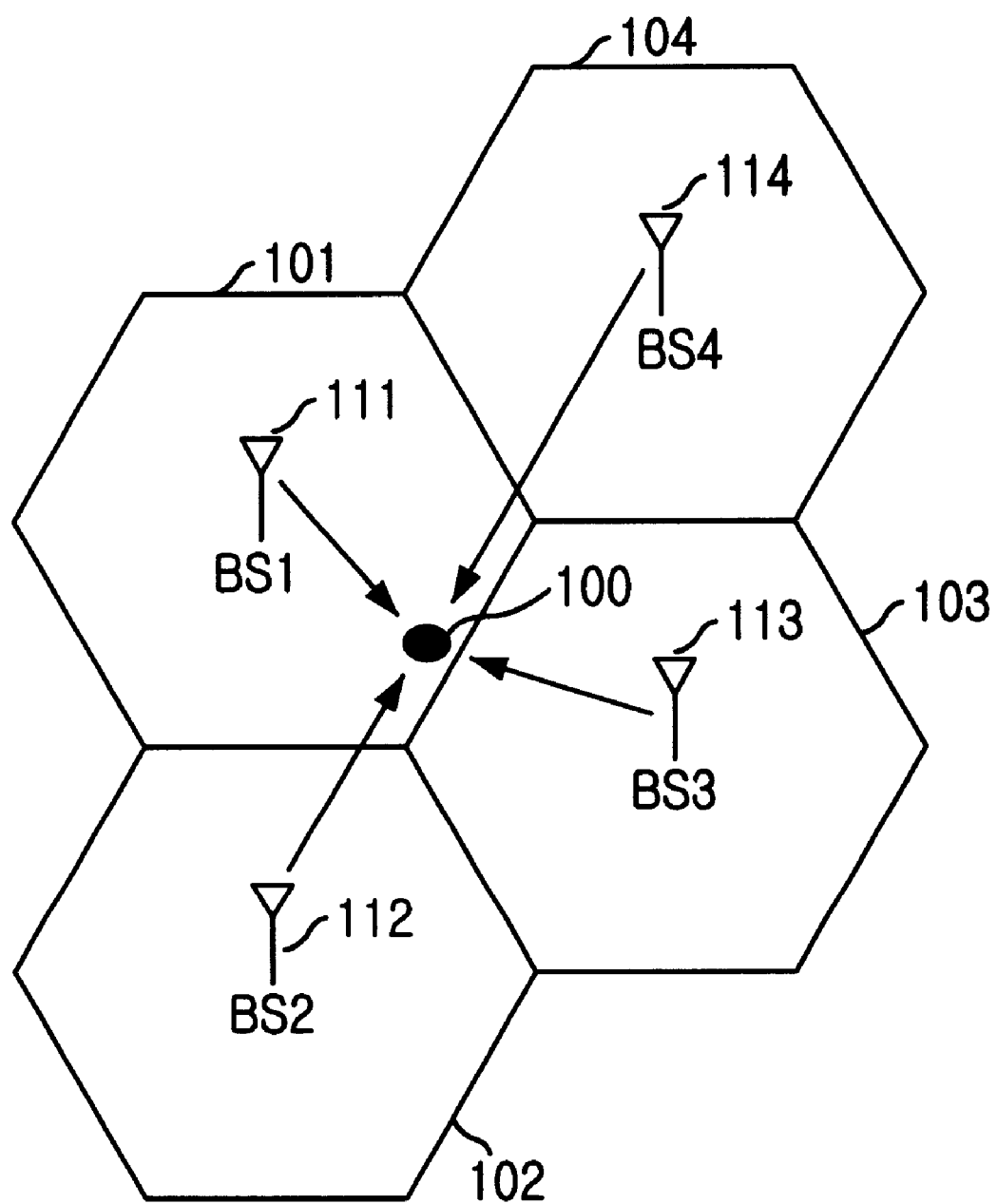
FIG. 1 is a diagram illustrating a path of a forward link signal between base stations and a mobile station.

FIG. 1 is a diagram illustrating a path of a forward link signal between base stations and a mobile station.

Referring to FIG. 1, "100" denotes a mobile station and "111" to "114" denote base stations. Generally, in the mobile communication system, the transmission signal power of the base station is limited to a region where the base station can communicate is restricted to a predetermined region which is called a cell. "101" to "104" represent the cells of the base stations.

The mobile station 100 receives signals transmitted from not only the base station 101 to which the mobile station 100 belongs, but also the neighbor base stations 102 to 105.

If the mobile station 100 is located at a boundary between cells, then intensity of the interference signals from the neighbor base station are maximized.

Referring to FIG. 1, the most influenced neighbor base stations of the mobile station 100 are the base stations 112 to 114.

Since the pilot signals are open well known to the mobile station, the mobile station can cancel the pilot signal transmitted from the neighbor base stations by estimating the pilot signals from neighbor base station in order to decrease the interference signal.

Figure 2:
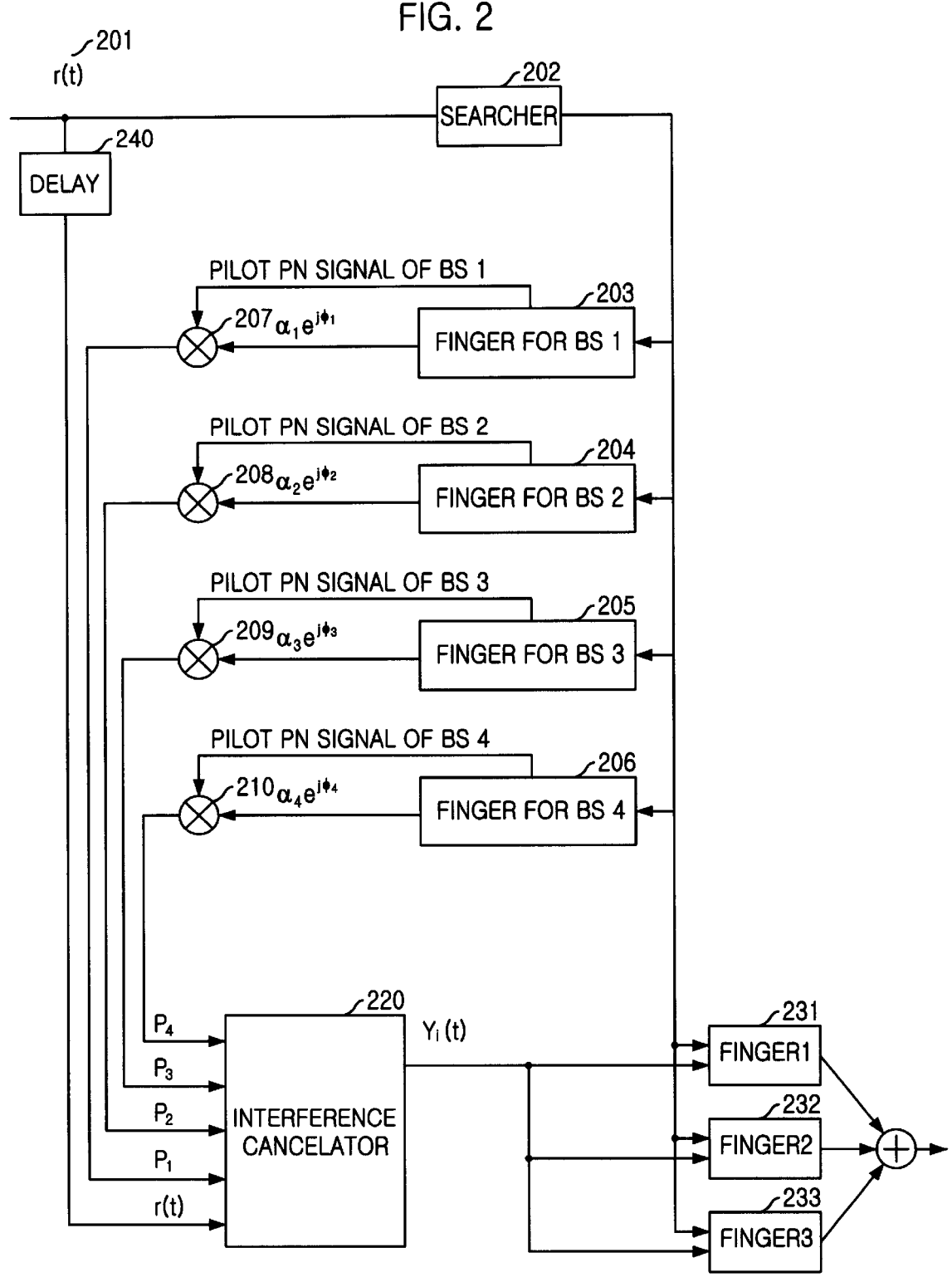
FIG. 2 is a block diagram of a demodulator of a mobile station canceling pilot signals from neighbor base stations in accordance with the preferred embodiment of the present invention.

FIG. 2 is a diagram of a demodulator of a mobile station canceling pilot signals from neighbor base stations in accordance with the preferred embodiment of the present invention.

For easy understanding the present invention, first, an operation principle of the demodulator of the mobile station is explained briefly in below.

A pilot signal transmitted from the neighbor base stations is an interference signal having a white noise characteristic. Therefore, the demodulator needs to cancel the pilot signal transmitted from the neighbor base station, which is the interference signal, for improving a quality of the mobile communication system. For canceling the pilot signal of the neighbor base station, the demodulator estimates the pilot signal of the neighbor base station and generates estimated the pilot signal of the neighbor base station. If the estimated pilot signal of the neighbor base station is subtracted from the received signal, then the interference signal will be removed from the received signal. Therefore, a remained signal is the pilot signal from the base station to which the mobile station belongs.

Referring to FIG. 2, a demodulator of the present invention includes a searcher 202, fingers 203 to 206, multipliers 207 to 210, an interference cancelator 220 and a delay 240. The searcher 202 searches pilot signals transmitted from the base stations and detects an offset of a pseudo noise (PN) for each base station. The searcher 202 sends the detected offset of the pseudo noise (PN) to the finger 203, 204, 205 or 206. The finger 203, 204, 205 or 206 obtains a value of $\alpha_i e^{j\Phi_i}$ by a channel estimation of each base station and generates the pilot PN signal synchronized with the pilot PN signal of each base station by detecting synchronization information from the PN signals of each base station. The multiplier 207, 208, 209 or 210 multiplies $\alpha_i e^{j\Phi_i}$ by the pilot PN signal for generating an estimated interference signal. The interference cancelator 230 cancels the interference signal. The delay 240 delays input of the received signal r(t) to the interference cancelator 230.

r(t) in FIG. 2 represents a received signal of the mobile station, which is an over-sampled signal.

Demodulation method in the mobile station in accordance with the preferred embodiment of the present invention is explained in below.

First, the searcher 202 searches pilot signals transmitted from not only the base station to which the mobile station belongs, but also neighbor base stations. The searcher 202 detects a pseudo noise (PN) of each base station and sends the detected PN to the fingers 203, 204, 205 or 206. The finger 203, 204, 205 and 206 detects information of base station including a name of the base station, a last accessing time, an unused time, a channel of a base station and a location of a base station by analyzing the detected PN.

Next, each finger 203, 204, 205 or 206 estimates a value of $\alpha_i e^{j\Phi_i}$, which are characteristics of a radio channel, by performing a channel estimation of a signal for the base station. $\alpha_i e^{j\Phi_i}$ includes an amplitude and a phase of a channel.

After estimating $\alpha_i e^{j\Phi_i}$, a pilot PN signal is generated according to analyzation result of detected PN. For generating an estimated interference signal, $\alpha_i e^{j\Phi_i}$ is multiplied by the pilot PN signal.

The estimated interference signals are inputted into the interference cancelator 220 for canceling the interference signal. For canceling the interference signal from the received signal r(t), the received signal is delayed to be sent to the interference cancelator as much as time necessary for generating the estimated interference signal at the delay 240 and then the delayed signal is inputted into the interference cancelator 220.

In the interference cancelator 220, signs of estimated interference signals $P_1$, $P_2$, $P_3$ and $P_4$ are inversed and added to the received signal r(t) in order to cancel the interference signal.

An output signal $Y_f(t)$ of the interference cancelator 220, remained after cancellation, is transmitted to the fingers 231, 232 and 233 and used for demodulating.

The interference cancelator 220 is explained below in detail with refer to FIG. 3.

Figure 3:
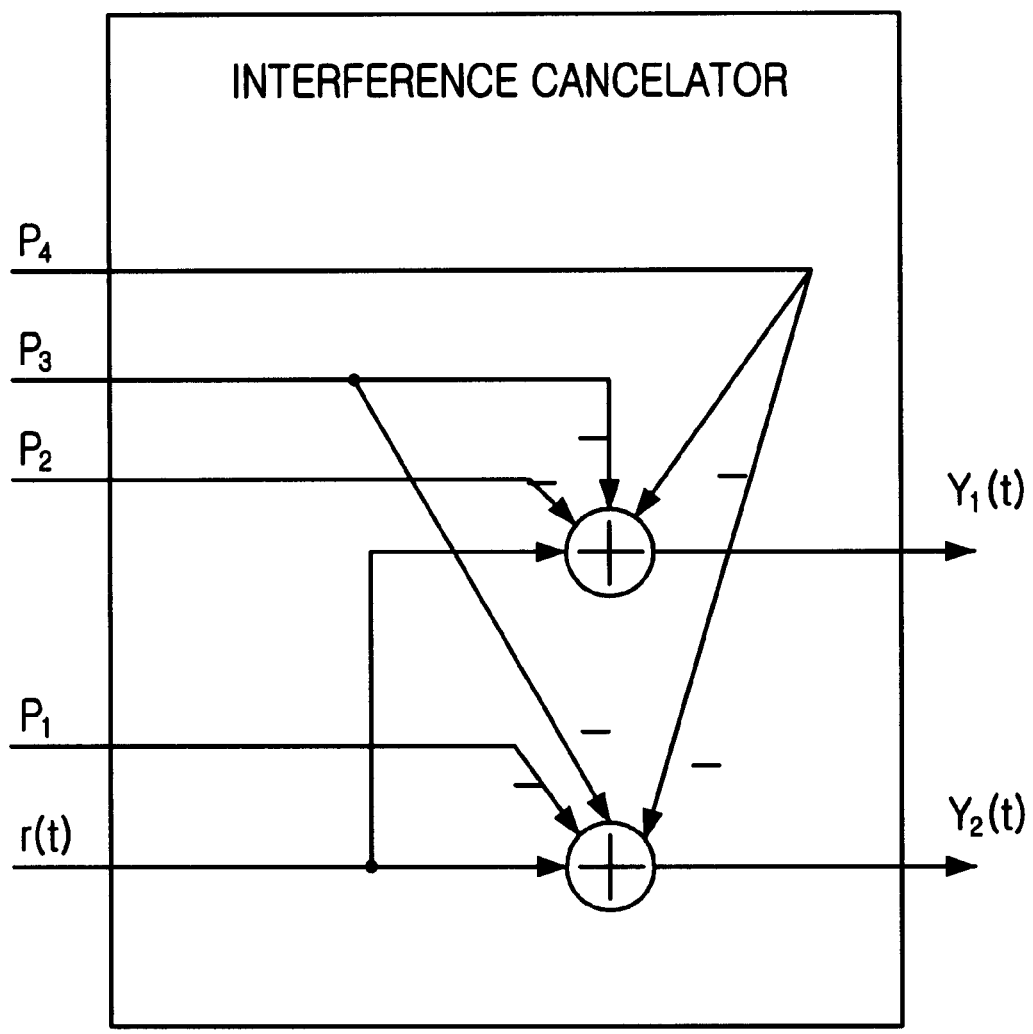
FIG. 3 is a diagram illustrating operations of an interference cancelator in accordance with the present invention.

FIG. 3 is a diagram illustrating operations of an interference cancelator in accordance with the present invention.

Referring to FIG. 3, the interference cancelator is designed by considering a soft-handoff. In case of the soft-handoff, received signals from two base stations are demodulated at the same time. For example, if the mobile station is communicated with a second base station, then pilot signals P1, P3 and P4 transmitted from the neighbor base stations are interference signals and have to be removed. Therefore, as shown in FIG. 3, P1, P3 and P4 are subtracted from the received signal r(t) and a remained signal $Y_2(t)$ is outputted and sent to the fingers 231, 232 and 233 used for demodulating.

Figure 4:
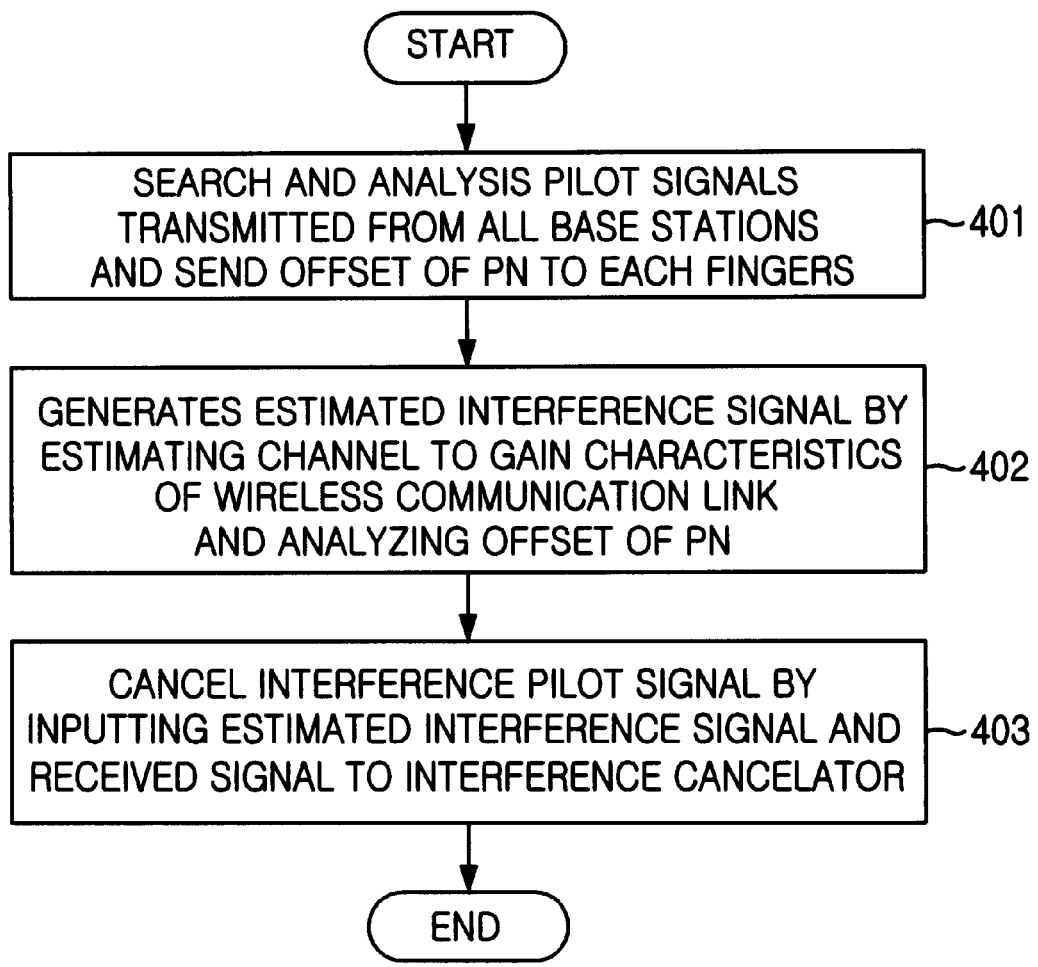
FIG. 4 is a flowchart illustrating a demodulation method for canceling the pilot signal from neighbor base stations in accordance with the preferred embodiment of the present invention.

FIG. 4 is a flowchart illustrating a demodulation method for canceling the pilot signals from neighbor base stations in accordance with the preferred embodiment of the present invention.

Referring to FIG. 4, at first, a searcher searches pilot signals transmitted from not only a base station to which a mobile station belongs, but also neighbor base stations and detects a pseudo noise (PN) of each base stations. After detecting, the searcher sends the detected PN of each base station to a finger at step 401.

At step 402, the finger obtains a value of $\alpha_i e^{j\Phi_i}$ by performing a channel estimation for each base station and generates a pilot PN signal synchronized with the pilot PN signal of each base station by analyzing the offset of detected PN. The finger also multiplies the generated pilot PN signal with $\alpha_i e^{j\Phi_i}$ for generating estimated interference signal.

The estimated interference signal is inputted into an interference cancelator for removing the interference signal at step 403.

The demodulator of the present invention searches pilot signals transmitted from the neighbor base stations to detect the PN signal of the base station and sends an offset of the detected PN signal in pilot signals of each base station to fingers. The finger performs the channel estimation according to signal of each base station and estimated interference signal is inputted to the interference cancelator for removing the interference signal. The pilot signal interference cancelator cancels the pilot interference signals transmitted from the neighbor base stations.

The present invention provides an apparatus and method of a demodulator for canceling a pilot signal transmitted from a base station of a neighbor cell for increasing a bandwidth of downlink transmission channel and improving the demodulator operatable in low signal-to-noise ratio ($E_b/N_o$).

The above mentioned present invention can be implemented as a program and stored into computer readable record medium including a CD-ROM, a RAM, a floppy disk, a hard disk and an optical magneto disk.

While the present invention has been described with respect to certain preferred embodiments, it will be apparent to those skilled in the art that various changes and modifications may be made without departing from the scope of the invention as defined in the following claims.

What is claimed is:

1. An apparatus for canceling pilot signals from neighbor base stations to a mobile station, said apparatus comprising:

search means for finding signals transmitted from neighbor base stations;

estimation means for generating an estimated interference signal by estimating channels to detect characteristics of wireless channels of the neighbor base stations;

cancellation means for canceling an interference signal in the received signal based on the estimated interference signal outputted from said estimation means and signals received from the neighbor base stations; and delay means for delaying input of the received signal to said cancellation means as much as time necessary for generating the estimated interference signal in said estimation means.

2. The apparatus as recited in claim 1, wherein said search means searches pilot signals transmitted from not only a base station to which a mobile station belongs but also the neighbor base stations, analyzes the pilot signal to detect an offset of a pseudo noise (PN) and sends the detected offset of the pseudo noise (PN) of each base station to said estimation means.

3. The apparatus as recited claim 1, wherein said estimation means detects characteristics of the wireless channel, $\alpha_i e^{j\Phi_i}$ by estimating channels of each base station, generates a pilot PN signal synchronized according to the detected offset of pseudo noise in said search means and generates the estimated interference signal by multiplying the $\alpha_i e^{j\Phi_i}$ and the pilot PN signal.

4. A method for canceling pilot signals of neighbor base stations, comprising the steps of:

a) searching signals transmitted from the neighbor base stations to a mobile station by analyzing a received signals;

b) generating an estimated interference signal by estimating channels of the base stations to detect characteristics of wireless channels of the neighbor base stations and generating the estimated interference signal; and c) canceling an interference signal calculated by using the estimated interference signal and the signals received from the neighbor base stations.

5. The method as recited in claim 4, wherein said step a) searches pilot signals transmitted from not only a base station to which the mobile station belongs but also the neighbor base stations, analyzes the pilot signal to detect an offset of a pseudo noise (PN).

6. The method as recited in claim 4, wherein said step b) includes the steps of:

b1) detecting characteristics of the wireless channel, $\alpha_i e^{j\Phi_i}$ by estimating channels of each base station;

b2) generating a pilot PN signal synchronized according to the detected offset of the pseudo noise; and b3) generating the estimated interference signal by multiplying the $\alpha_i e^{j\Phi_i}$ and the pilot PN signal.

7. The method as recited in claim 4 wherein said step c) cancels the interference signal by subtracting the estimated interference signal from the signals received from the neighbor base stations.

8. A computer readable record medium storing instructions for implementing method for canceling pilot signals transmitted from neighbor base stations, the method comprising steps of:

a) searching signals transmitted from the neighbor base stations to a mobile station by analyzing a received signals;

b) generating an estimated interference signal by estimating channels of the base stations to detect characteristics of wireless channels of the neighbor base stations and generating the estimated interference signal; and c) canceling an interference signal calculated by using the estimated interference signal and the signals received from the neighbor base stations.

* * * * *